United States Patent
Grieger

(10) Patent No.: US 11,827,121 B2
(45) Date of Patent: Nov. 28, 2023

(54) DEVICE FOR ATTACHING A SEAT ASSEMBLY IN A VEHICLE AND VEHICLE

(71) Applicant: Aguti Produktentwicklung & Design GmbH, Langenargen (DE)

(72) Inventor: Andreas Grieger, Kressbronn (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 33 days.

(21) Appl. No.: 17/582,099

(22) Filed: Jan. 24, 2022

(65) Prior Publication Data

US 2022/0185149 A1 Jun. 16, 2022

Related U.S. Application Data

(63) Continuation of application No. PCT/EP2020/069821, filed on Jul. 14, 2020.

(30) Foreign Application Priority Data

Jul. 25, 2019 (DE) .................. 10 2019 120 194.2

(51) Int. Cl.
*B60N 2/005* (2006.01)
*B60N 2/08* (2006.01)

(52) U.S. Cl.
CPC .......... *B60N 2/005* (2013.01); *B60N 2/0818* (2013.01); *B60N 2/0868* (2013.01)

(58) Field of Classification Search
CPC .... B60N 2/005; B60N 2/0818; B60N 2/0831; B60N 2/0868; B60N 2/0856;

(Continued)

(56) References Cited

U.S. PATENT DOCUMENTS 6,736,458 B2 5/2004 Chabanne et al.
2006/0131470 A1* 6/2006 Yamada .............. B60N 2/0715
248/424

(Continued)

FOREIGN PATENT DOCUMENTS

DE 601 00 054 T2 7/2003
DE 20 2005 013 714 U1 12/2005

(Continued)

OTHER PUBLICATIONS

Bingert et al. DE 102009048498 A1, machine translation, ip.com, Apr. 14, 2011 (Year: 2011).*

(Continued)

*Primary Examiner* — Jason S Morrow
*Assistant Examiner* — Wenwei Zhuo
(74) *Attorney, Agent, or Firm* — BURR PATENT LAW, PLLC

(57) ABSTRACT

The invention relates to a device for attaching a seat assembly in a vehicle, wherein the device comprises a carriage and a floor rail, wherein the carriage can be fixed on the floor rail, wherein the floor rail has a longitudinal slot with a support section limiting the longitudinal slot, wherein a locking assembly having a locking element adjustably accommodated on the carriage is provided for fixing the carriage attached to the floor rail. According to the invention, the locking assembly comprises multiple recesses in at least one rail longitudinal wall of the floor rail, wherein the locking element has a latch section and a contact section in such a way that, with the fixing of the carriage, the latch section engages into a recess in the rail longitudinal wall and the contact section comes into contact with the inner side of the support section.

13 Claims, 4 Drawing Sheets

(58) Field of Classification Search
CPC ............... B60N 2/0887; B60N 2/0727; B60N 2/01525; B60N 2205/20
USPC .......................................... 296/65.13, 65.03
See application file for complete search history.

(56) References Cited

U.S. PATENT DOCUMENTS

| | | | | |
|---|---|---|---|---|
| 2009/0058169 | A1* | 3/2009 | Soga | B60N 2/0705 297/463.1 |
| 2013/0056604 | A1* | 3/2013 | Hayashi | B60N 2/0887 248/429 |
| 2018/0222352 | A1* | 8/2018 | Flick | B60N 2/0727 |
| 2020/0070688 | A1* | 3/2020 | Nishio | B60N 2/0875 |

FOREIGN PATENT DOCUMENTS

| | | | | |
|---|---|---|---|---|
| DE | 10 2004 035 480 A1 | | 2/2006 | |
| DE | 10 2009 048 498 A1 | | 4/2011 | |
| DE | 102009048498 A1 | * | 4/2011 | ........... B60N 2/0155 |
| EP | 0615879 A1 | * | 9/1994 | ........... B60N 2/0868 |
| EP | 0 949 112 A1 | | 10/1999 | |
| EP | 1 334 865 A2 | | 8/2003 | |
| FR | 2 889 118 A1 | | 2/2007 | |
| FR | 2889118 A1 | * | 2/2007 | ......... B60N 2/01525 |
| FR | 2 950 292 A1 | | 3/2011 | |

OTHER PUBLICATIONS

International Search Report and Written Opinion (Application No. PCT/EP2020/069821) dated Nov. 12, 2020 (with English translation).
German Search Report (Application No. 10 2019 120 194.2) dated Jan. 13, 2020.

* cited by examiner

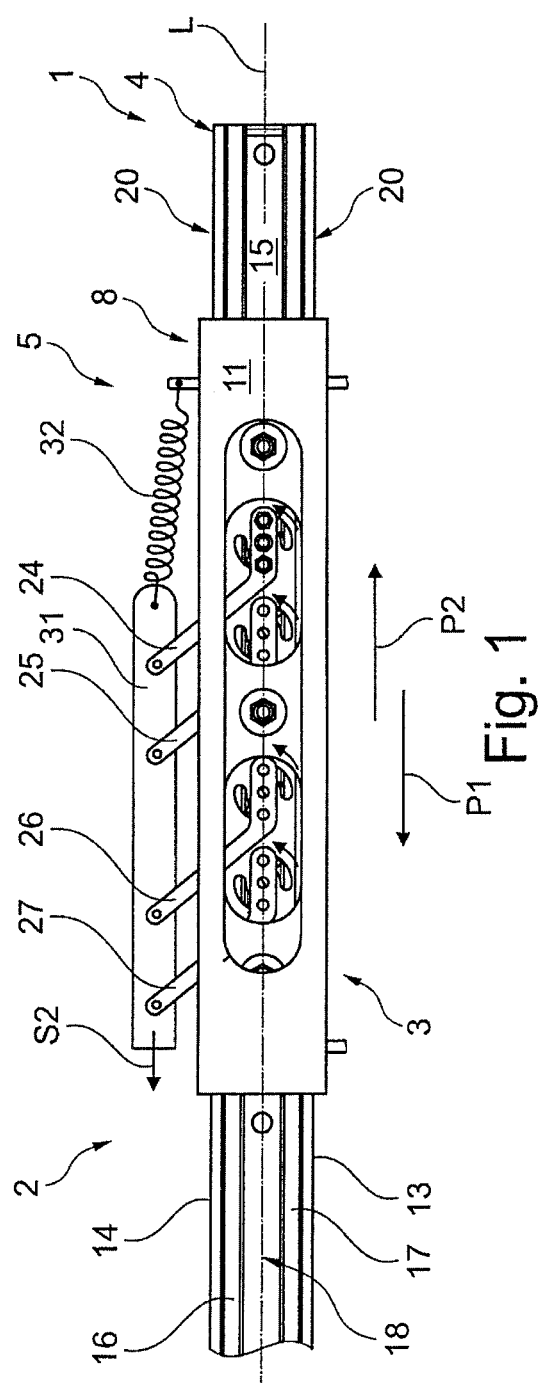
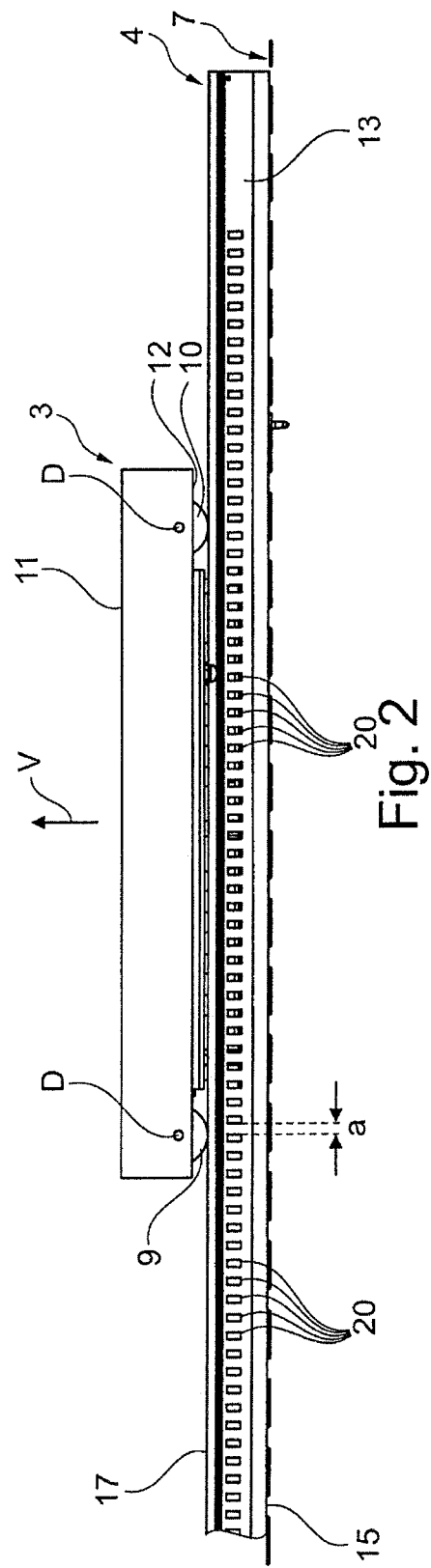

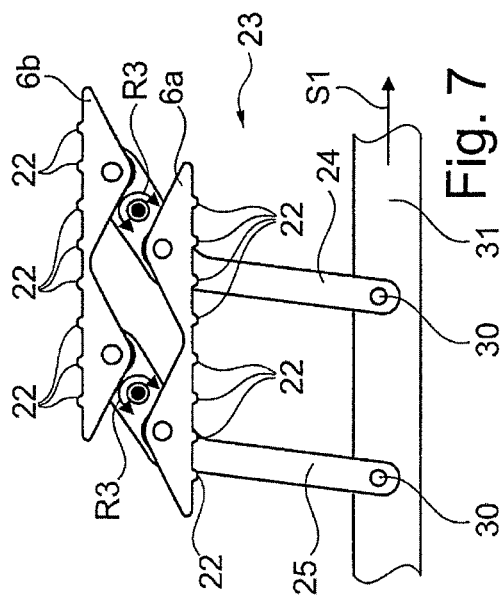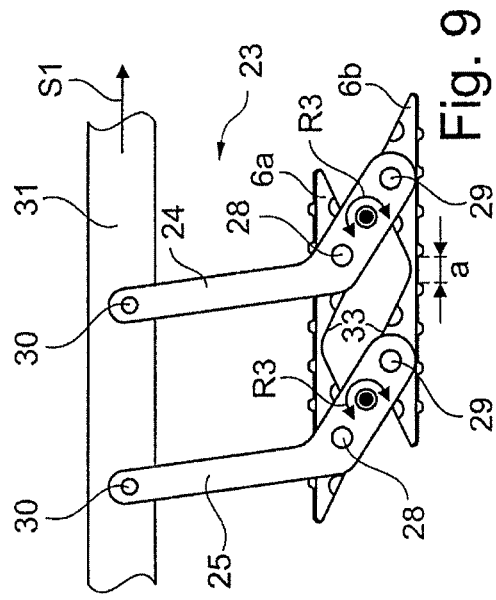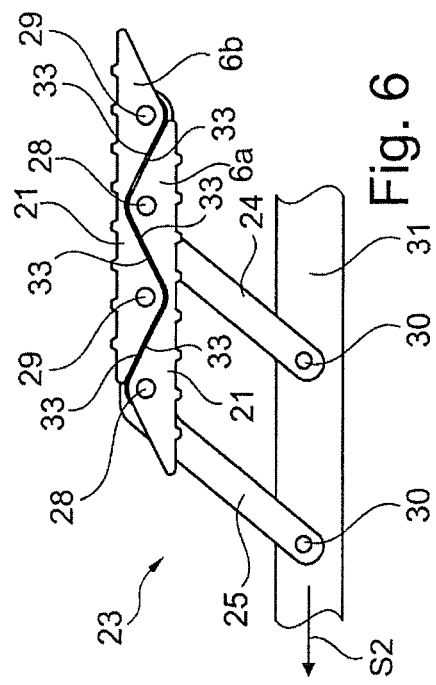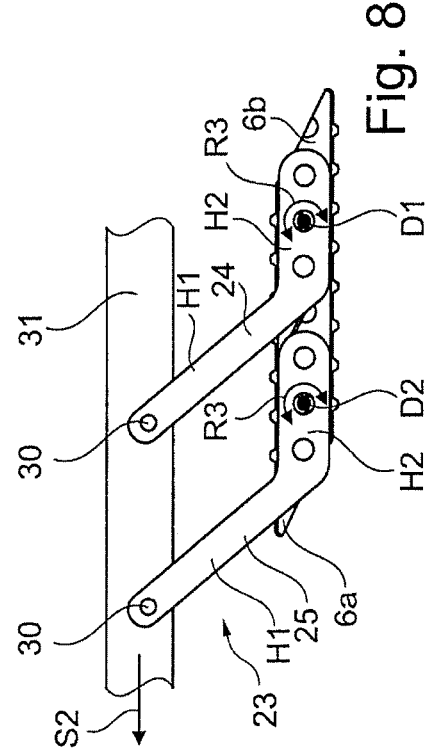

DEVICE FOR ATTACHING A SEAT ASSEMBLY IN A VEHICLE AND VEHICLE

CROSS REFERENCE TO RELATED APPLICATIONS

This application is a continuation of International Application No. PCT/EP2020/069821 filed Jul. 14, 2020, which designated the United States, and claims the benefit under 35 USC § 119(a)-(d) of German Application No. 10 2019 120 194.2 filed Jul. 25, 2019, the entireties of which are incorporated herein by reference.

FIELD OF THE INVENTION

The present invention relates to a device for attaching a seat assembly and vehicle.

BACKGROUND OF THE INVENTION

When fitting out vehicles or attaching interior equipment in the vehicle, such as a vehicle seat, a technically and economically advantageous attachment is desired. In addition, the interior equipment, such as, for example, the seat assembly, is intended to be mountable simply and securely on a vehicle floor. For this purpose, use is made, for example, of devices having a carriage which is attachable to a vehicle floor rail.

Portions of the interior equipment or of the vehicle seat that are close to the floor, such as a seat basic structure, are accommodated on the carriage.

SUMMARY OF THE INVENTION

It is an object of the present invention to improve the attaching of vehicle interior equipment or of a vehicle seat in a vehicle, in particular, in respect of an economically and technically advantageous design. In particular, interior equipment or a seat assembly is intended to be able to be positioned in an uncomplicated and flexible manner in a vehicle.

The present invention is based on a device for attaching a seat assembly in a vehicle, wherein the device has a carriage, which is connectable to the seat assembly, and a floor rail, wherein the carriage can be arranged on the floor rail and, in the arranged state, is movable in the longitudinal direction of the floor rail and is fixable at different points in the longitudinal direction of the floor rail, wherein the floor rail is designed as a hollow profile with opposite rail longitudinal walls extending in the longitudinal direction of the floor rail, and, between the rail longitudinal walls, has a rail cavity of the floor rail, wherein the floor rail has a longitudinal slot with a support portion delimiting the longitudinal slot, wherein the support portion has an outer side, on which the carriage, in the arranged state of the carriage, is supported on the floor rail, wherein the support portion has an inner side which is opposite the outer side and is adjacent to the rail cavity, wherein, in order to fix the carriage which is attached to the floor rail, a locking assembly having a locking element received adjustably on the carriage is provided.

The attachment device according to the present invention is designed, in particular, as a vehicle rail locking device. The attachment device according to the present invention serves, in particular, for attaching or for adapting seats, seat benches and other equipment in vehicles, such as, for example, cupboards, boxes or other interior equipment in vehicles, such as passenger vehicles, utility vehicles and/or, for example, camper vans or caravans. The adaptation takes place by releasably locking the carriage to the floor rail. The carriage which is removable from the floor rail is attachable to a floor rail or vehicle rail in the vehicle, wherein the floor rail, for example, belongs originally to the vehicle or is provided therein. Alternatively or additionally to original floor rails in the vehicle, the floor rail of the device can be installed retrospectively in the vehicle on a vehicle floor of the vehicle.

The floor rail is preferably a section bar having a cross section remaining the same over the length, or is an elongate hollow profile made, for example, from a steel material, for example, a polygonal or square hollow profile or a special profile having a different cross-sectional shape. The floor rail, such as a rectilinear longitudinal floor rail having, for example, a U or channel profile at least approximately in cross section, has the preferably continuous longitudinal slot which is present on the upper side and is open toward an interior or hollow space of the floor rail. The uniform slot which is preferably continuous in longitudinal extent has, for example, two opposite parallel longitudinal edges of the slot, for example, a respective free longitudinal edge of two support portions. The floor rail is produced, for example, from a sheet metal material by forming, for example by a bending operation, or is produced from a rolled, drawn or pressed steel material.

The carriage is preferably also made from a steel material and has a length which corresponds to a fraction of the length of the floor rail. The width of a basic body of the carriage, the basic body meaning the carriage without a locking assembly and without rolling means, is in the region of the width of the floor rail or may be slightly somewhat wider than the floor rail. The height of the carriage can likewise be in the range of the height of the floor rail or can deviate somewhat therefrom such that overall the device permits a compact arrangement.

Preferably, the device comprises precisely two floor rails which are alignable in parallel and preferably two carriages, with an associated carriage being present on each of the two floor rails. Preferably, two carriages are provided, wherein the two carriages are identical, and therefore the two carriages are fixable with a respective associated locking assembly to the respective floor rail. In principle, just one carriage can also be fixable to an associated, for example, first floor rail with a locking assembly and the other carriage is not lockable to the second floor rail, and no locking elements are provided or effective on the other carriage.

The essence of the present invention consists in that the locking assembly comprises a plurality of recesses in at least one rail longitudinal wall of the floor rail, the recesses being spaced apart from one another in the longitudinal direction of the floor rail, and the locking element has a latching portion and a contact portion in such a manner that, during the fixing of the carriage, the latching portion enters into a recess in the rail longitudinal wall and the contact portion comes into contact on the inner side of the support portion such that, in the locked state, the latching portion blocks a movement of the carriage in the longitudinal direction of the floor rail and prevents the carriage from lifting off from the floor rail. With the present invention, a locking assembly of compact design is provided, with which a reliably acting locking of the carriage to the floor rail at different longitudinal points of the floor rail is possible.

The locking assembly has, for example, at least one latching portion on a locking element or on each of a plurality of locking elements; preferably, a plurality of latching portions is provided on all the locking elements.

With reference to the outer side of the support portion, it is advantageous that the contact portion reaches behind or under the support portion such that the contact portion is in contact in the inner cavity of the floor rail or comes into contact with the inner side of the support portion and provides a play-free fixing of the carriage to the floor rail in a vertical lifting direction. An undesirable, for example, even slight movement clearance in the vertical direction is eliminated. According to the present invention, in the locked state, the carriage is locked in a secure position on the floor rail without undesirable wobbling. Accordingly, the contact portion comes into, for example, pressing contact with the inner side of the support portion. The inner side of the support portion forms an undercut portion on the floor rail from the outside or with respect to the outwardly open side of the longitudinal slot. The undercut preferably extends continuously on both sides of the longitudinal slot over the entire length thereof, formed by the two web-like support portions delimiting the longitudinal slot on the longitudinal sides and on both sides, on the left and right of the longitudinal slot. The undercut as an anchoring for the contact portion means a secure, at least vertical fixing of the carriage to the floor rail.

The preferably plurality of latching portions provide horizontal fixing by respectively engaging in a corresponding recess.

The locking element is preferably a flat component, for example, made from a single- or two- or multi-layer sheet metal material or is, for example, plate-like.

The carriage is preferably provided with rolling and/or sliding mechanisms for the linear longitudinal movement of the carriage along the floor rail in the unlocked state of the carriage attached thereto. The rolling and/or sliding mechanisms interact in rolling and/or sliding contact on a portion of the floor rail. The relevant portion is preferably at least an upper side of the floor rail or preferably the outer side of the support portion. The rolling mechanisms provided are preferably two or more wheels, rollers or rolls which are accommodated in a rotating manner on the carriage and are made, for example, of steel or plastic, preferably one roller or roll in each of the two longitudinal end regions of the carriage. A respective axis of rotation of the rollers or rolls is oriented horizontally transversely with respect to the longitudinal extent of the carriage, in the installed state.

Furthermore, it is advantageous that there is a plurality of mutually offset latching portions on a locking element, the latching portions being designed in such a manner that, during the fixing of the carriage to the floor rail, a latching portion engages in a respective recess in the associated rail longitudinal wall of the floor rail. Preferably, as far as all the latching portions are concerned, precisely one latching portion engages in precisely one recess. Each engagement of a respective latching portion in an associated recess contributes to providing a holding force for securing the carriage to the floor rail such that, in total, a comparatively high holding function is realized depending on the overall number of intermeshing latching portions and recesses. The distances of the latching portions from one another in the longitudinal direction of the device or in the longitudinal direction of the carriage are uniform and correspond to the distances of the recesses from one another in the longitudinal direction of the device or of the floor rail. Depending on the number of latching portions on, for example, a longitudinal side of the locking element, on which the latching portions are present, the carriage is fixed over a defined or predeterminable length on the floor rail. The strength of the maximally transmittable holding force with the device, i.e. between the preferably two carriages and the two floor rails, is accordingly dependent on the number of the latching portions engaging in recesses in the sum total of latching portions which are provided on the two carriages.

With the latching portions and recesses intermeshing in the locked state, in particular, a direction-dependent holding function can be realized for the carriage and thus, for example, for the vehicle seat, the holding function in particular or substantially opposing a movement in the axial direction or in the longitudinal direction of the floor rail.

In addition, depending on the size of the surface contact between surfaces on the carriage, formed by the surface of the contact portion on the locking element, on the one hand, and the relevant surfaces of the inner side of the support portion, on the other hand, in the locked state, i.e. the surfaces on the contact portion and on the support portion inner side that actually come into contact, a holding function is realized which opposes a movement upward in the vertical direction or transversely with respect to the floor rail. Accordingly, in the locking state, the contact portion comes into contact from below on the support portion inner side.

A multiplicity of preferably identically configured latching portions are formed on a locking element; preferably, on a locking element there are between 5 and 15 latching portions next to one another in the longitudinal direction of the carriage, in a row, preferably eight latching portions are designed. A carriage preferably has a plurality of, for example, four locking elements, i.e. with a total of, for example, 32 latching portions. The latching portions are present on the locking element with a corresponding distance between adjacent latching portions in accordance with the distance between adjacent recesses of a rail longitudinal wall. The latching portions which are preferably identical to one another are coordinated appropriately for the recesses which are preferably identical to one another such that a respective latching portion engages in a precisely fitting manner, optionally with a small amount of frictional contact, in the respectively associated recess. Preferably, the latching portion comes at least with opposite axial outer sides of the latching portion, as viewed in the longitudinal direction of the floor rail, into contact against axial walls of the recess. The two axial walls delimit the recess, as viewed in the longitudinal direction of the floor rail, on a first axial side of the recess and on a second axial side of the recess. Therefore, in the locking state, a latching portion preferably comes into contact with at least two or precisely two sides of the wall of the associated recess.

It is not ruled out that, in the locking or engaged state of locking element and floor rail, a latching portion additionally comes into touching contact with further portions of the latching portion on sides other than the axial sides or on other wall portions of the relevant recess.

According to an advantageous variant of the present invention, the carriage comprises a first locking element and a second locking element, wherein, during the fixing of the carriage to the floor rail, the first locking element enters with a latching portion into a recess in the first rail longitudinal wall and the second locking element enters with a latching portion into a recess in the second rail longitudinal wall. A mechanically comparatively stable fixing of the carriage to the floor rail is therefore achieved, preferably symmetrically on the device. Accordingly, in the two rail longitudinal walls, preferably over the at least substantial rail length, there are in each case a plurality of recesses which are offset from one another in the longitudinal direction of the floor rail, preferably with in each case an identical distance between two adjacent recesses. Accordingly, on the first locking element, preferably distributed over the entire longitudinal side, there is a plurality of identical latching portions for engaging in a plurality of recesses on the one associated rail longitudinal wall. On the second locking element, there is likewise preferably a plurality of identical latching portions for engaging in a plurality of recesses on the other associated rail longitudinal wall.

The first locking element and the second locking element are constructed identically or are identical, which is advantageous. Preferably, precisely four identical locking elements or two pairs of locking elements are provided on a carriage.

The first locking element and the second locking element are present, for example, lying opposite each other, with respect to a longitudinal axis of the device or to the longitudinal axis of the carriage. On a carriage, the first locking element and the second locking element are furthermore present preferably interacting in pairs, and are preferably jointly movable in a controlled manner as a pair of locking elements. In the locked state of the carriage, the first locking element of the pair of locking elements can be brought with its latching portions into engagement with recesses in a first rail longitudinal side and, in the locked state of the carriage, the second locking element of the pair of locking elements can be brought with its latching portions into engagement with recesses in a second rail longitudinal side of the floor rail that lies opposite the first rail longitudinal side. The two locking elements of the pair of locking elements are preferably adjustable jointly or simultaneously, preferably via a controller, for example, a lever assembly. The first locking element of the pair of locking elements can be moved outward with respect to the longitudinal axis of the carriage from an inwardly adjusted position, or in a release position which does not define a locking state, even if the second locking element of the pair of locking elements moves in the same manner or identically outward from the release position. Conversely, the two locking elements of the pair of locking elements move in a controlled manner or jointly simultaneously and identically inward from the locked position back into the release position.

Another advantage of the present invention arises if the first locking element and the second locking element are separate components which are coupled in terms of movement to one another. For the coupling, a controller is preferably provided, for example with a lever assembly.

There are preferably two identically constructed and identically acting pairs of locking elements on a carriage. It is therefore advantageous if precisely four locking elements are provided on the carriage. Preferably, the four locking elements on the carriage are all coupled in terms of movement to one another or are movable in a controlled manner. The four locking elements are preferably movable simultaneously outward or inward, for example, in a manner controlled via a controller, preferably comprising a lever assembly. All four locking elements are controlled in such a manner that all four are jointly or simultaneously in the locked position or all four are jointly or simultaneously in the locking state or can be brought into the latter and can be moved out of the latter. Preferably, an associated adjustable lever portion of the lever assembly belongs to a pair of locking elements, preferably two lever arms on a pair of locking elements. In the case of two pairs of locking elements, in each case two lever arms, i.e. a total of four lever arms, are provided.

The two or all four lever arms preferably act on a common operating element. The operating element is adjustable, preferably force- or spring-loaded. The operating element is, for example, actuated manually, counter to the force or spring action, wherein the locking assembly or the, for example, four locking elements can be brought jointly or all simultaneously out of the locking position. In the process, the latching portions are moved out of the recesses and the contact portions come out of contact from the inner side of the respective support portion. In the unlocked state, if, for example, two carriages of the device are unlocked, the carriages are movable or displaceable freely along the associated floor rail, this taking place in a linearly guided manner on the floor rail. For the unlocking or the movement of the carriage, preferably a permanent action on the operating element is required. As soon as the operating element is no longer actuated or is released, the locking elements are preferably automatically reset into the locking position by the spring loading of the operating element by, for example, a spring, such as, for example, a helical spring. The operating element is preferably under the action of spring force and is coupled in terms of movement to the locking elements via, for example, a lever assembly.

Furthermore, an advantage consists in that the carriage comprises a first locking element and a second locking element, wherein, during the fixing of the carriage to the floor rail, a contact portion of the first locking element comes into contact with the inner side of a first support portion of the floor rail and a contact portion of the second locking element comes into contact with the inner side of a second support portion of the floor rail. The two preferably separate support portions delimit the longitudinal slot on the upper side on both sides and are opposite each other. A first support portion extends on a first longitudinal side of the longitudinal slot along the length of the longitudinal slot and the second support portion extends on a second longitudinal side of the longitudinal slot along the length of the longitudinal slot. In the installed state of the device in a vehicle, the two support portions with their respective upper side form a horizontally oriented region of the floor rail. The support portions are formed, for example, by strip-shaped webs which are planar or flat on the upper side. The two webs delimit the longitudinal slot on both sides, in each case one web on one longitudinal side. The upper side of the support portions can end flush with the outer side of the rail longitudinal walls, or the support portions project outward somewhat over the outer side of the respective rail longitudinal wall such that the supporting surface for the carriage or the rollers or rolls present thereon is enlarged.

The first support portion preferably protrudes at a right angle on the first rail longitudinal wall and projects in the direction of the longitudinal slot or, with its free longitudinal edge, forms one of two longitudinal delimitations of the longitudinal slot. The second support portion is present, for example, on the second rail longitudinal wall and projects in the direction of the longitudinal slot or, with its free longitudinal edge, forms a further longitudinal delimitation of the two longitudinal delimitations of the longitudinal slot. In the installed state, the first support portion and the second support portion are oriented horizontally and, on the upper side, form a flat, planar surface on both sides of the longitudinal slot. The carriage is supported on the surface, for example, via two rollers or wheels of the carriage that roll along the surface in order to move the carriage to and fro.

It is advantageous, according to the present invention, if the locking element is accommodated in a linearly adjustable manner on the carriage. A simply configured and secure locking and unlocking is therefore provided.

Preferably, a plurality of locking elements is present, wherein all or, for example, every two or four locking elements are accommodated on the carriage so as to be adjustable in the same manner and simultaneously linearly. With the linear adjustment, the locking with the or on the two or the four locking elements can be simultaneously reliably set up and released.

One advantage consists in that the locking assembly has a controller with a lever assembly for adjusting a locking element. Preferably, in the case of a plurality of locking elements, all of the locking elements are operable with the controller, simultaneously or synchronously and with the same effect. With a lever assembly, a high operating force can be applied, and a robust and compactly sized arrangement achieved for moving the locking element. The lever assembly is preferably connected to a manually actuable operating element. The operating element permits the manual unlocking of the locking element or locking elements. A force, such as in particular a spring force, advantageously acts on the lever assembly for automatically setting up the locking state of the locking elements. The force or the spring acts, for example, directly on a portion of the lever assembly or indirectly, for example, via an action on the operating element. The operating element is preferably connected to the lever assembly by a lever arm of the lever assembly or by all the lever arms.

The lever assembly advantageously comprises a movable lever arm which is coupled to the locking element. With a lever arm, comparatively high forces can be applied for fixing the carriage to the floor rail. In addition, via a lever arm, the operation for releasing the fixing of the carriage or of the locking state of the locking elements can advantageously take place, for example, manually from the outside.

The lever assembly preferably has at least one lever arm, wherein the lever arm is coupled, on the one hand, to the operating element and is coupled, on the other hand, in an identically acting manner to, for example, two opposite locking elements. In this way, the two locking elements can advantageously be moved simultaneously and in the same manner or moved out of the locking position by, for example, manual action on the operating element, or alternatively by motorized adjustment of the operating element, via the lever assembly or the lever arm. The two locking elements which are operable by a joint lever arm are preferably present in such a manner that precisely one of the two locking elements engages by means of its latching portions in recesses of the one, for example, right rail longitudinal wall, or is movable out of the latter, and the other of the two locking elements engages by means of its latching portions in recesses of the other, for example, left rail longitudinal wall or is movable out of the latter.

The, for example, two locking elements, in each case by themselves, and an associated lever arm are preferably connected to one another in an articulated manner. Preferably, two lever arms in each case act on two locking elements. The at least one lever arm is preferably movably accommodated on the carriage likewise in an articulated manner. With a rotational movement of the at least one lever arm mounted in an articulated manner, a linear movement of the two locking elements acting thereon takes place, this being possible repeatedly reversibly.

The at least one lever arm is accommodated on the carriage, for example, in a manner rotatable about an axis of rotation, in the installed state of the device. The lever arm is preferably rotatable about an axis which is directed transversely with respect to the longitudinal axis of the floor rail, preferably about a vertical axis with respect to the attached state of the carriage to the floor rail.

It is advantageous if the lever assembly has a lever arm which is mounted rotatably on the carriage.

A rotation of the lever arm in a first direction causes an adjustment of the, for example, two locking elements in a first direction and a rotation of the lever arm in a second direction signifies an adjustment of the, for example, two locking elements in a second direction.

According to a modification of the present invention, the lever assembly comprises a lever arm which is both coupled to the first locking element and is also coupled to the second locking element. A simultaneous adjustment of two locking elements in the same manner can therefore be easily realized. The two locking elements which are adjustable with the joint lever arm are preferably opposite each other with respect to the longitudinal axis of the carriage or of the floor rail.

Another advantage consists in that a first locking element and a second locking element are provided, wherein the lever assembly comprises two lever arms, wherein the two lever arms each act on the first locking element and on the second locking element. A mechanically stable arrangement is therefore provided.

The two lever arms are preferably mounted rotatably about a respective separate axis of rotation or lever arm axis of rotation, wherein the two axes of rotation are preferably parallel. It is also preferred if the two lever arms are configured in angled form with two rectilinear lever arm portions, preferably the two lever arms are identical. The respective axis of rotation is preferably fixed in position on the carriage.

Furthermore, it is proposed that the lever assembly comprises two lever arms which act on a common operating element, wherein the operating element is spring-loaded. The lever assembly is designed, in particular, in such a manner that, if there is a plurality of locking elements, the latter can be moved jointly and simultaneously by precisely one operating element, which is advantageous for a simple manual adjustment or unlocking and locking of the locking elements.

The carriage advantageously has precisely two or preferably precisely four locking elements each having a plurality of latching portions, wherein two rotationally mounted lever arms of the lever assembly are each coupled to two associated locking elements in order, with one operation of the lever assembly, to jointly release a locking state of the two or four locking elements.

The locking state is released, and the locking state is set up advantageously by a linear movement of the precisely one operating element in a release direction of the operating element, wherein the operating element is connected to all, for example, the two or four lever arms.

Furthermore, an advantage consists in that there is a spring assembly which brings about an automatic movement of the operating element in a fixing direction such that the plurality of lever arms of the lever assembly is reset into a fixed state of the carriage on the floor rail.

The automatic resetting takes place in such a manner that the locking is automatically ensured by the spring assembly.

The present invention extends to a vehicle having a vehicle floor, wherein a device as claimed in one of the previous embodiments is present. Equipment can thus be arranged firmly fixed in the interior of the vehicle, for example, vehicle seats, vehicle furniture or boxes at different locations in the interior of the vehicle, or can be briefly adjusted in the longitudinal direction of the floor rails. The floor rails may be floor rails originally provided in the vehicle or floor rails fastened retrospectively therein.

BRIEF DESCRIPTION OF THE DRAWINGS

Further features and advantages of the present invention are explained in more detail with reference to an exemplary embodiment of a device according to the present invention that is illustrated in highly schematized form in the figures.

FIG. 1 shows a view from above on a detail of a device according to the present invention in the unlocked state;

FIG. 2 shows the device according to FIG. 1 from the side;

FIG. 6 shows a detail of part of the carriage, which is shown in FIG. 3, from below in an unlocked state or in an unlocking position;

FIG. 7 shows the detail according to FIG. 6 in a locked state;

FIG. 8 shows the detail according to FIG. 6 from above; and

FIG. 9 shows the detail according to FIG. 7 from above.

DETAILED DESCRIPTION OF THE INVENTION

Figure 3:
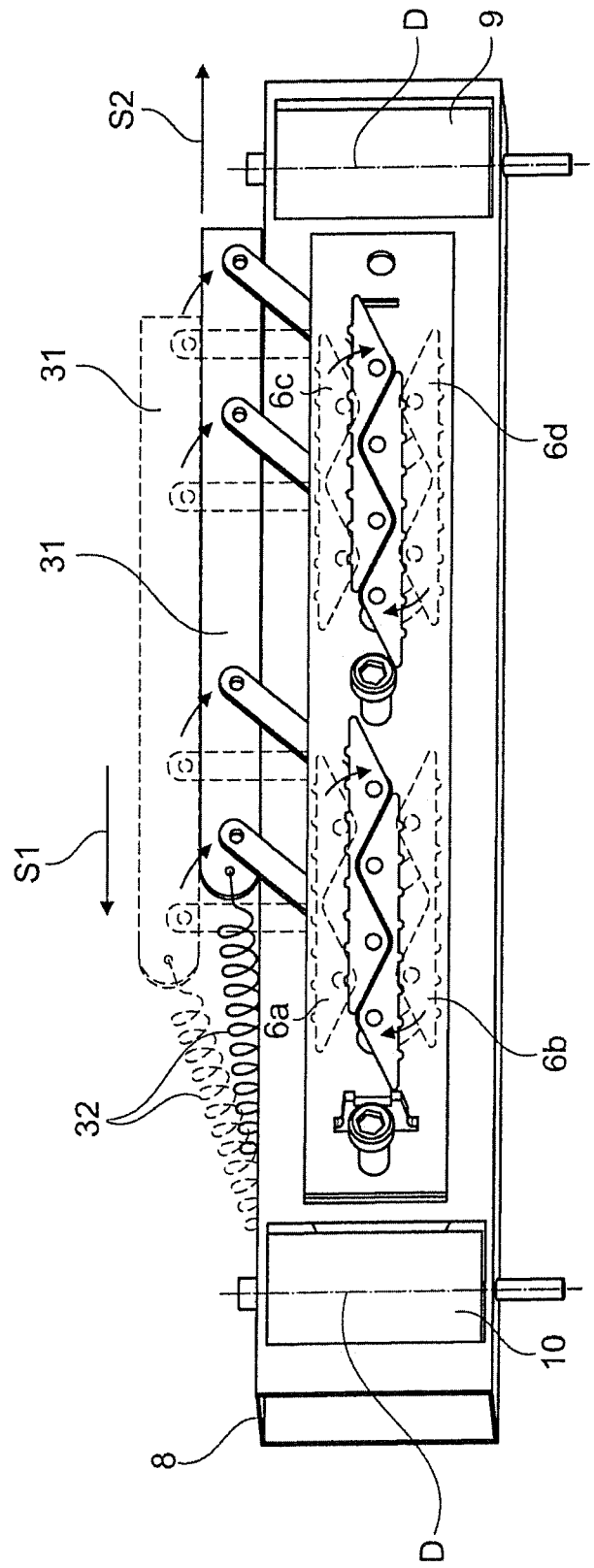
FIG. 3 shows a bottom view of a carriage of the device according to FIGS. 1 and 2, wherein a locked state is illustrated and an unlocked state is indicated.

FIGS. 1 and 2 show a device 1 according to the present invention for attaching a seat assembly (not illustrated) in a vehicle. The attachment device 1 is designed, in particular, as a vehicle rail locking device 2 and has a carriage 3, which is connectable to the seat assembly, and a floor rail 4, which is shown only over a partial length in FIGS. 1 and 2. As a rule, the attachment device 1 has precisely two identical carriages 3 and precisely two identical floor rails 4, wherein precisely one of the two carriages 3 is attachable to each floor rail 4. The preferably two separate parallel floor rails 4, a floor rail 4 having the longitudinal axis L (see FIG. 1), are fixed, for example screwed, on a vehicle floor 7 of the vehicle in a manner aligned in particular parallel in the longitudinal direction of the vehicle, wherein the vehicle floor 7 is indicated schematically by dashed lines in FIG. 2.

In the attached state of the carriage 3, as FIGS. 1 and 2 show for a floor rail 4, the carriage 3 is placed or supported at the top on the associated floor rail 4 and, in the unlocked state, is accommodated displaceably on and along the associated floor rail 4 in the direction P1 and in the opposite direction P2.

In order to fix the carriage 3 to the floor rail 4 in a predeterminable position of the floor rail 4, with there being a multiplicity of different possible positions, in particular, for locking and unlocking the carriage 3 thereon/therefrom, a locking assembly 5 having locking elements 6a, 6b, 6c and 6d, which are accommodated adjustably on the carriage 3, is provided. The locking assembly 5 is coordinated in such a manner that the carriage 3, and therefore, for example, a vehicle seat assembly which is attachable thereto, is fixable or fixedly installable along the floor rail 4 in the longitudinal direction thereof at different individually selectable points and therefore at different points in the longitudinal direction of the vehicle in the vehicle interior of the vehicle.

The carriage 3 can be arranged on the floor rail 4 and, in the arranged state, is movable, in particular, movable in a rolling manner, in the longitudinal direction of the floor rail 4 in order to reach the different points along the floor rail 4 or to pass from one point to another point. The carriage 3 has a hollow basic body 8 which here is in the shape of a square with a partially open upper side 11 and a lower side 12 with two rollers 9 and 10 which are mounted on the basic body 8, are each rotatable about an axis of rotation D and protrude somewhat on the open lower side 12 of the basic body 8.

The floor rail 4 is designed as a hollow profile which is open at the top on one side and has opposite rail longitudinal walls 13, 14 extending in the longitudinal direction of the floor rail 4, with a rail base 15, which connects the rail longitudinal walls 13, 14 at the bottom, and two support portions 16, 17. The support portions 16, 17 each delimit a longitudinal side of a centrally running, rectilinear longitudinal slot 18 on the upper side of the floor rail 4. A rail cavity 19 with a hollow volume is formed within the floor rail 4.

A multiplicity of window-like recesses 20 of rectangular shape which pass through the longitudinal walls 13, 14 and are identical to one another are formed in at least one of the two rail longitudinal walls 13, 14, here by way of example and preferably in both rail longitudinal walls 13 and 14, the recesses 20 having the same longitudinal position with respect to the two rail longitudinal walls 13, 14 or lying opposite each other with respect to the longitudinal axis L of the floor rail 4. Two opposite recesses are arranged, preferably in alignment, transversely with respect to the longitudinal axis L of the floor rail 4. The longitudinal distance a, identical to one another, between two adjacent recesses 20 is, for example, in the single-digit or double-digit millimeter range.

Each of the two support portions 16, 17 has an outer side which forms an upper outer side 16a, 17a of the floor rail 4. The carriage 3 is supported with its two rollers 9, 10 on the two outer sides 16a, 17a of the support portions 16, 17 in the arranged state of the carriage 3 on the floor rail 4. The support portions 16, 17 each have an inner side 16b, 17b which lies opposite the outer side 16a, 17a and is adjacent to the rail cavity 19.

Figure 5:
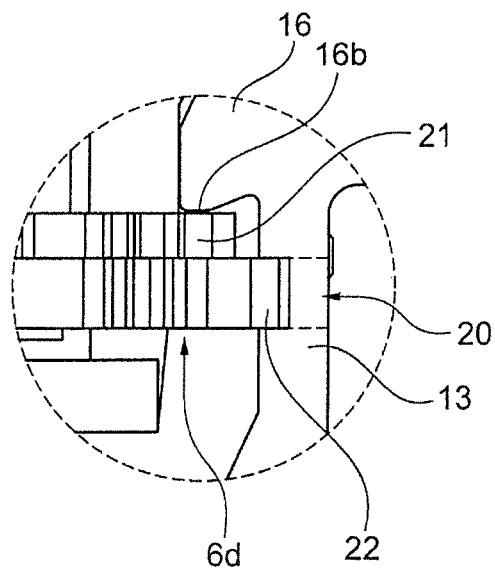
FIG. 5 shows an enlarged illustration of the region A enclosed in FIG. 4.

On the locking elements 6a-6d, a portion of a flat, planar upper side of the locking elements 6a-6d in each case on the upper side forms a contact portion 21 (see FIG. 5). Latching portions 22 in the form of protruding studs are formed on the respective, free narrow side of the locking elements 6a-6d that is directed outward with respect to the respective rail longitudinal wall 13 or 14. In each case, eight latching portions 22 formed identically to one another are configured protruding on the end sides of each of the locking elements 6a-6d. The longitudinal distance between two adjacent latching portions 22 is a, corresponding to the longitudinal distance a between two adjacent recesses 20.

In the locked state of the carriage 3 on the floor rail 4 (see FIGS. 3, 7, 9), in each case precisely one latching portion 22 engages in a fully sitting manner or without play or preferably with a comparatively very small amount of play in the millimeter fraction range, in precisely one associated recess 20 such that the carriage 3 is secured, in particular, against an axial movement along the floor rail 4 in the direction of the floor rail longitudinal axis L. In principle, in the locked state with the latching portions 22 engaging in the recesses 20, lifting off of the carriage 3, which is fixed to the floor rail 4, upward in the vertical direction V (see FIG. 2) is also prevented.

In the locked state, the latching portions 22 of the two locking elements 6a, 6c engage in recesses 20 in the rail longitudinal wall 14, and the latching portions 22 of the two other locking elements 6b, 6d engage in recesses 20 in the other rail longitudinal wall 13. Accordingly, on the locked carriage 3, 16 latching portions 22 come into engagement on the rail longitudinal wall 13 and a further 16 latching portions 22 come into engagement on the rail longitudinal wall 14, i.e. a total of 32 latching portions 22 enter for locking action into 32 recesses 20 on the floor rail 4.

Figure 4:
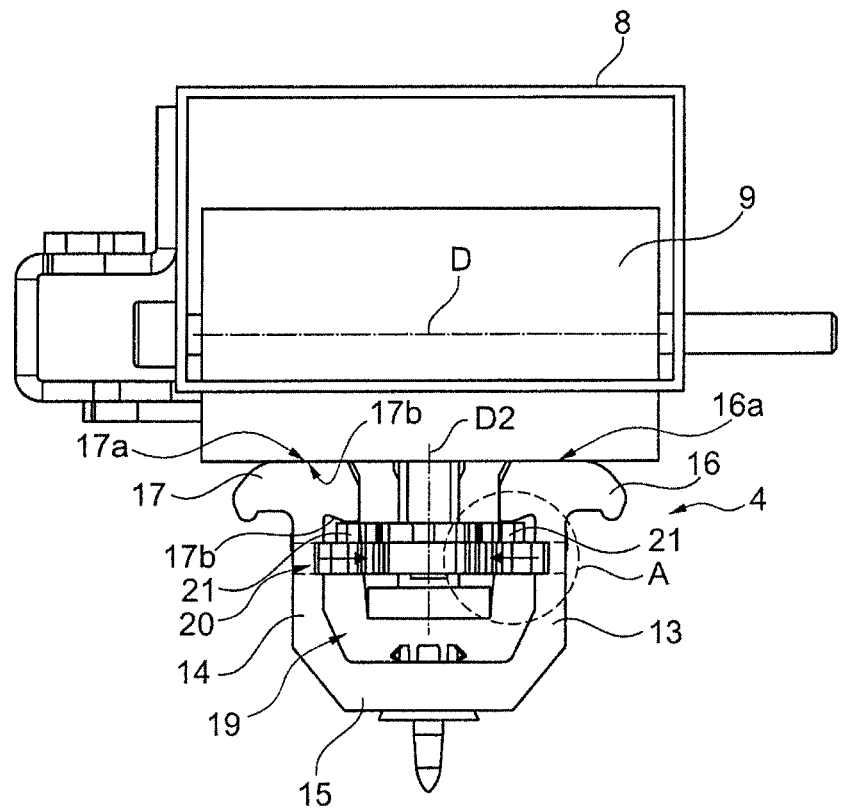
FIG. 4 shows an end view of the device according to FIGS. 1 and 2 in the locked state.

In the fixed or locked state of the carriage 3, a lifting off of the carriage 3, which is fixed to the floor rail 4, upward in the vertical direction V is substantially prevented by the respective upper sides of the locking elements 6a-6d coming into contact by means of their contact portions 21 with the inner side 16b or 17b of the support portions 16 or 17 (see FIGS. 4 and 5).

The locking assembly 5 has a controller with, for example, a lever assembly 23 for the controlled adjustment of the locking elements 6a to 6d.

The lever assembly 23 comprises two lever arms 24, 25 which are synchronously movable and are rotatable in the clockwise direction and counterclockwise direction according to R3 and are coupled to the locking elements 6a, 6b. The two lever arms 24, 25 each act on the locking element 6a and on the locking element 6b. The two lever arms 24, 25 are constructed identically as a two-armed lever having two rectilinear lever arm portions H1 and H2. The lever arm portions H1 and H2 are at an inner angle of approximately 125 degrees of angle with respect to each other.

For rotation according to R3, the two lever arms 24, 25 are mounted on the carriage 3 so as to be rotatable on an axis of rotation D1 or D2 in each case oriented perpendicularly to the longitudinal axis L or vertically in the use or installed state.

Each lever arm 24, 25 is coupled with its lever arm portion H1 via a rotary joint 30 to a rigid, elongate operating element 31 and with its lever arm portion H2 via two rotary joints 28 and 29 to the respective locking element 6a (rotary joint 28) or 6b (rotary joint 29).

The two further lever arms 26, 27 of the lever assembly 23 (see FIG. 1) are constructed identically or in a corresponding manner to the lever arms 24, 25. The lever arms 26, 27 are correspondingly coupled to the locking elements 6c, 6d.

The operating element 31 on which all four lever arms 26, 27 act in an articulated manner in the same way via a respective rotary joint 30, is spring-loaded by, for example, a mechanical spring, such as a helical spring 32, which exerts a tensile force on the operating element 31 in an adjustment direction S1 if the operating element 31 is not pulled from the outside in direction S2 with sufficient force. By means of the spring force or tensile force in action, the operating element 31 is thus offset and, with the operating element 31, the lever arms 24-27 are rotated in the same manner and synchronously, with the lever arm portions H1 being perpendicular to the longitudinal axis L. In the process, the locked state is set up in which the four locking elements 6a-6d are pushed linearly apart and the locked state is set up, which is illustrated in FIGS. 7 and 9 or 3.

In the position of the locking elements 6a-6d in which they are moved apart, i.e. in the locked state, the latching portions 22, as viewed perpendicularly to the longitudinal axis L, are then in each case present exactly opposite the locking elements 6a-6d, i.e. half of the overall number of all the latching portions 22 are on the left-hand side and the other half of the overall number of all the latching portions 22 are on the right-hand side.

For unlocking purposes or in order to release the locked state so that the carriage 3 can be moved along the floor rail 4, the operating element 31 is pulled, for example manually, in the release direction S2 (see FIGS. 1, 3, 6, 8) which is directed counter to the locking adjustment direction S1. In the process, the helical spring is stretched and, via the lever arms 24-27, all four locking elements 6a-6d are adjusted linearly or moved toward one another or moved together in the same manner and synchronously such that the unlocked state is set up (see FIGS. 6, 8). In this case, the latching portions 22 come out of the recesses 20 on each locking element 6a-6d and the contact portions 21 come out of contact from the lower side 12 of the support portions 16 or 17. The locking elements 6a-6d which have completely moved together have a width transversely with respect to the longitudinal axis L that is somewhat smaller than the width of the longitudinal slot 18, and therefore the carriage 3 can be lifted off the floor rail upward or vertically in the direction V, if required.

For the neat moving together and moving apart during the linear adjustment of the four locking elements 6a-6d, obliquely directed narrow sides 33 are formed on the inside thereon, opposite the outer narrow sides with the latching portions 22. The narrow sides 33 match the shape of the respective narrow sides 33 of the oppositely adjacent locking elements 6a-6d with respect to the longitudinal axis L, such that and in the unlocked state and in the position of two oppositely adjacent locking elements 6a-6d in which they are moved together, the respective narrow sides 33 come into planar, matching mutual contact (see FIG. 6).

LIST OF REFERENCE SIGNS

1 Device
2 Vehicle rail locking device
3 Carriage
4 Floor rail
5 Locking assembly
6a-6d Locking element
7 Vehicle floor
8 Basic body
9, 10 Roller
11 Upper side
12 Lower side
13, 14 Rail longitudinal wall
15 Rail base
16 Support portion
16a Outer side
16b Inner side
17 Support portion
17a Outer side
17b Inner side
18 Longitudinal slot
19 Rail cavity
20 Recess
21 Contact portion
22 Latching portion
23 Lever arrangement
24, 25 Lever arm
26, 27 Lever arm
28, 29 Rotary joint
30 Rotary joint
31 Operating element
32 Helical spring
33 Narrow side

The invention claimed is:

1. A device for attaching a seat assembly in a vehicle, comprising a carriage connectable to the seat assembly, and a floor rail on which the carriage is arranged movably in the longitudinal direction of the floor rail and fixable at different points in the longitudinal direction of the floor rail, wherein the floor rail has a hollow profile with opposite rail longitudinal walls extending in the longitudinal direction of the floor rail, and, between the rail longitudinal walls, has a rail cavity of the floor rail, wherein the floor rail has a longitudinal slot with a support portion delimiting the longitudinal slot, wherein the support portion has an outer side, on which the carriage, in the arranged state of the carriage, is supported on the floor rail, wherein the support portion has an inner side which is opposite the outer side and is adjacent to the rail cavity, wherein, in order to fix the carriage which is attached to the floor rail, further comprising a locking assembly having at least one locking element received adjustably on the carriage, wherein the locking assembly comprises a plurality of recesses in at least one rail longitudinal wall of the floor rail, said recesses being spaced apart from one another in the longitudinal direction of the floor rail, and the at least one locking element has a latching portion and a contact portion in such a manner that, during the fixing of the carriage, the latching portion enters into a recess in the rail longitudinal wall and the contact portion comes into contact on the inner side of the support portion such that, in the locked state, the latching portion blocks a movement of the carriage in the longitudinal direction of the floor rail and prevents the carriage from lifting off from the floor rail,
    wherein the carriage comprises a first locking element and a second locking element,
    wherein the locking assembly has a controller with a lever assembly for adjusting the locking element, and
    wherein the lever assembly comprises two lever arms that each act on the first locking element and on the second locking element.

2. The device as claimed in claim 1, wherein there is a plurality of mutually offset latching portions on the locking element, said latching portions being designed in such a manner that, during the fixing of the carriage to the floor rail, a latching portion engages in a respective recess in the associated rail longitudinal wall of the floor rail.

3. The device as claimed in claim 1, wherein, during the fixing of the carriage to the floor rail, the first locking element enters with a latching portion into a recess in the first rail longitudinal wall and the second locking element enters with a latching portion into a recess in the second rail longitudinal wall.

4. The device as claimed in claim 3, wherein the first locking element and the second locking element are separate components which are coupled in terms of movement to one another.

5. The device as claimed in claim 1, wherein, during the fixing of the carriage to the floor rail, a contact portion of the first locking element comes into contact with the inner side of a first support portion of the floor rail and a contact portion of the second locking element comes into contact with the inner side of a second support portion of the floor rail.

6. The device as claimed in claim 1, wherein the locking element is accommodated in a linearly adjustable manner on the carriage.

7. The device as claimed in claim 1, wherein the lever assembly comprises a movable lever arm which is coupled to the locking element.

8. The device as claimed in claim 1, wherein the lever assembly has a lever arm which is mounted rotatably on the carriage.

9. The device as claimed in claim 1, wherein the lever assembly comprises a lever arm which is both coupled to the first locking element and is also coupled to the second locking element.

10. The device as claimed in claim 1, wherein the lever assembly comprises two lever arms which act on a common operating element, wherein the operating element is spring-loaded.

11. The device as claimed in claim 1, wherein the carriage has two or four locking elements each having a plurality of latching portions, wherein two rotationally mounted lever arms of the lever assembly are each coupled to two locking elements in order, with one operation of the lever assembly, to jointly release a locking state of the two locking elements.

12. The device as claimed in claim 10, further comprising a spring assembly which brings about an automatic movement of the common operating element in a fixing direction such that the plurality of lever arms of the lever assembly is reset into a fixed state of the carriage on the floor rail.

13. A vehicle having a vehicle floor and a device as claimed in claim 1.

* * * * *